(12) United States Patent
Zhou

(10) Patent No.: US 12,066,581 B2
(45) Date of Patent: Aug. 20, 2024

(54) RAY DETECTOR SUBSTRATE, RAY DETECTOR AND RAY DETECTION METHOD

(71) Applicants: Beijing BOE Sensor Technology Co., Ltd., Beijing (CN); BOE TECHNOLOGY GROUP CO., LTD., Beijing (CN)

(72) Inventor: Lin Zhou, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 131 days.

(21) Appl. No.: 17/782,285

(22) PCT Filed: Jul. 8, 2021

(86) PCT No.: PCT/CN2021/105330
§ 371 (c)(1),
(2) Date: Jun. 3, 2022

(87) PCT Pub. No.: WO2022/033253
PCT Pub. Date: Feb. 17, 2022

(65) Prior Publication Data
US 2022/0381929 A1 Dec. 1, 2022

(30) Foreign Application Priority Data
Aug. 13, 2020 (CN) .......................... 202010812375.3

(51) Int. Cl.
*G01T 1/208* (2006.01)
*G01T 1/202* (2006.01)

(52) U.S. Cl.
CPC ............ *G01T 1/208* (2013.01); *G01T 1/2023* (2013.01)

(58) Field of Classification Search
CPC .............................. G01T 1/208; G01T 1/2023
See application file for complete search history.

(56) References Cited

U.S. PATENT DOCUMENTS

| 2012/0001761 A1* | 1/2012 | Voutilainen ........... G01T 1/2006 |
| | | 250/361 R |
| 2018/0277608 A1* | 9/2018 | Lifka ..................... H10K 39/36 |

(Continued)

FOREIGN PATENT DOCUMENTS

| CN | 108962928 A | 12/2018 |
| CN | 109698250 A | 4/2019 |

(Continued)

OTHER PUBLICATIONS

First Office Action issued by the Chinese Patent Office for Application No. 202010812375.3 on Oct. 15, 2021.
Decision of Rejection issued by the Chinese Patent Office for Application No. 202010812375.3 on Apr. 29, 2022.

*Primary Examiner* — Hugh Maupin
(74) *Attorney, Agent, or Firm* — IP & T GROUP LLP

(57) ABSTRACT

A ray detector substrate has detection regions and includes a substrate, a first interdigital electrode and a second interdigital electrode disposed on a side of the substrate and located in each detection region, a first scintillator layer disposed on a side of the first interdigital electrode and the second interdigital electrode away from the substrate, and a second scintillator layer disposed on a side of first scintillator layer away from the substrate. The second scintillator layer is configured to convert part of rays incident onto the detection region into visible light, and transmit another part of the rays, so that the another part of the rays is incident onto the first scintillator layer through the second scintillator layer. The first scintillator layer is configured to convert the (Continued)

visible light converted by the second scintillator layer and the another part of the rays through the second scintillator layer into photocurrent.

19 Claims, 7 Drawing Sheets

(56) References Cited

U.S. PATENT DOCUMENTS

| | | | |
|---|---|---|---|
| 2019/0172964 A1* | 6/2019 | Hermes | H01L 31/09 |
| 2019/0187300 A1 | 6/2019 | Kim et al. | |
| 2019/0257959 A1* | 8/2019 | Thirimanne | G01T 1/241 |
| 2019/0388042 A1 | 12/2019 | Zhao et al. | |
| 2020/0020736 A1 | 1/2020 | Liang et al. | |
| 2021/0340021 A1* | 11/2021 | Xin | H01L 31/18 |
| 2022/0037550 A1 | 2/2022 | Liang et al. | |
| 2022/0190182 A1* | 6/2022 | Xin | G01T 1/24 |

FOREIGN PATENT DOCUMENTS

| | | |
|---|---|---|
| CN | 109863599 A | 6/2019 |
| CN | 110034133 A | 7/2019 |
| CN | 110176519 A | 8/2019 |
| CN | 111948696 A | 11/2020 |
| JP | 2000-46951 A | 2/2000 |
| KR | 10-2018-0021610 A | 3/2018 |
| KR | 10-2018-0024949 A | 3/2018 |
| KR | 10-2020-0075227 A | 6/2020 |

\* cited by examiner

RAY DETECTOR SUBSTRATE, RAY DETECTOR AND RAY DETECTION METHOD

CROSS-REFERENCE TO RELATED APPLICATIONS

This application is a national phase entry under 35 USC 371 of International Patent Application No. PCT/CN2021/105330, filed on Jul. 8, 2021, which claims priority to Chinese Patent Application No. 202010812375. 3, filed on Aug. 13, 2020, which are incorporated herein by reference in their entirety.

TECHNICAL FIELD

The present disclosure relates to the technical field of photoelectric detection, and in particular, to a ray detector substrate, a ray detector and a ray detection method.

BACKGROUND

Digital Radiography (DR) has become a main direction of digital radiography technologies due to its significant advantages such as high imaging speed, convenient operation, and high imaging resolution. A technical core of the digital radiography is a ray detector (e.g., an X-ray detector). The ray detector is a precise and valuable device, which plays a decisive role in imaging quality.

Ray detectors have been widely used in the fields such as non-destructive testing, medical testing and security inspection.

SUMMARY

In an aspect, a ray detector substrate is provided. The ray detector substrate has a plurality of detection regions. The ray detector substrate includes a substrate; a first interdigital electrode and a second interdigital electrode disposed on a side of the substrate and located in each detection region; a first scintillator layer disposed on a side of the first interdigital electrode and the second interdigital electrode away from the substrate; and a second scintillator layer disposed on a side of first scintillator layer away from the substrate. The second scintillator layer is configured to convert part of rays incident onto the detection region into visible light, and transmit another part of the rays, so that the another part of the rays is incident onto the first scintillator layer through the second scintillator layer. The first scintillator layer is configured to convert the visible light converted by the second scintillator layer and the another part of the rays through the second scintillator layer into photocurrent.

In some embodiments, a material of the first scintillator layer includes a first perovskite material, and a material of the second scintillator layer includes a second perovskite material.

In some embodiments, halogen element(s) of the first perovskite material and halogen element(s) of the second perovskite material are different.

In some embodiments, the halogen element(s) of the first perovskite material includes at least one of chlorine, bromine or iodine. The halogen element(s) of the second perovskite material includes at least one of chlorine, bromine or iodine.

In some embodiments, a band gap of the first scintillator layer is less than or equal to a band gap of the second scintillator layer.

In some embodiments, a thickness of the first scintillator layer is less than a thickness of the second scintillator layer.

In some embodiments, the thickness of the first scintillator layer is in a range of 0.1 μm to 20 μm, inclusive; and the thickness of the second scintillator layer is in a range of 30 μm to 300 μm, inclusive.

In some embodiments, the ray detector substrate further includes an insulating layer disposed on a side of the first interdigital electrode and the second interdigital electrode proximate to the first scintillator layer. A band gap of the insulating layer is in a range of 4 eV to 9 eV, inclusive.

In some embodiments, a thickness of the insulating layer is in a range of 1 nm to 10 nm, inclusive.

In some embodiments, a material of the insulating layer includes at least one of silicon nitride, an aluminum oxide, or a lead-containing compound.

In some embodiments, the ray detector substrate further includes a mesoporous film disposed on a side of the first interdigital electrode and the second interdigital electrode proximate to the first scintillator layer.

In some embodiments, a thickness of the mesoporous film is in a range of 0.1 μm to 100 μm, inclusive.

In some embodiments, a material of the mesoporous film includes at least one of a titanium oxide, a molybdenum oxide, a cobalt oxide, a zinc oxide, a magnesium oxide, a tin oxide, a chromium oxide or a cerium oxide.

In some embodiments, the ray detector substrate further includes a reflective layer disposed on a side of the second scintillator layer away from the substrate. The reflective layer is configured to transmit the rays to be incident onto the second scintillator layer through the reflective layer, and reflect the visible light that is converted by the second scintillator layer and incident onto the reflective layer.

In some embodiments, the ray detector substrate further includes: a plurality of gate lines disposed on a side of the substrate proximate to the first interdigital electrode and the second interdigital electrode and extending in a first direction; a plurality of data lines disposed on the side of the substrate proximate to the first interdigital electrode and the second interdigital electrode and extending in a second direction, the plurality of gate lines and the plurality of data lines being insulated from each other, and the plurality of gate lines and the plurality of data lines intersecting to define the plurality of detection regions; a plurality of bias voltage signal lines disposed in a same layer as the plurality of data lines and extending in the second direction; and a transistor disposed on the side of the substrate proximate to the first interdigital electrode and the second interdigital electrode and located in the detection region. One of a source and a drain of the transistor being electrically connected to a data line, the first interdigital electrode is electrically connected to another of the source and the drain of the transistor, and the second interdigital electrode is electrically connected to a bias voltage signal line.

In some embodiments, the ray detector substrate further includes a storage capacitor plate disposed in the detection region. The storage capacitor plate is arranged in a same layer as the plurality of gate lines. The storage capacitor plate, the first interdigital electrode, and the source or the drain of the transistor that is electrically connected to the first interdigital electrode constitute a storage capacitor.

In another aspect, a ray detector is provided. The ray detector includes: the ray detector substrate as described in any one of the above embodiments, a reading chip electrically connected to the ray detector substrate, and a bias voltage chip electrically connected to the ray detector substrate. The reading chip is configured to provide an operating voltage to the first interdigital electrode in the ray detector substrate, and read an electrical signal stored in the first interdigital electrode. The bias voltage chip is configured to provide a bias voltage to the second interdigital electrode in the ray detector substrate.

In yet another aspect, a ray detection method is provided. The detection method is applied to the ray detector as described in the above embodiments. The detection method includes: providing, by the reading chip in the ray detector, the operating voltage to the first interdigital electrode in the ray detector; providing, by the bias voltage chip in the ray detector, the bias voltage to the second interdigital electrode in the ray detector, an electric field being developed between the first interdigital electrode and the second interdigital electrode; the reading chip stopping providing the operating voltage, the rays being incident onto the second scintillator layer in the ray detector, the rays being converted into photocurrent due to action of the second scintillator layer and the first scintillator layer in the ray detector, and the first interdigital electrode storing the photocurrent; reading, by the reading chip, the photocurrent stored in the first interdigital electrode; and pulling down, by the reading chip, a potential of the first interdigital electrode to a reference potential of the reading chip.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, but are not limitations on actual sizes of products and actual processes of methods involved in the embodiments of the present disclosure.

DETAILED DESCRIPTION

Figure 1:
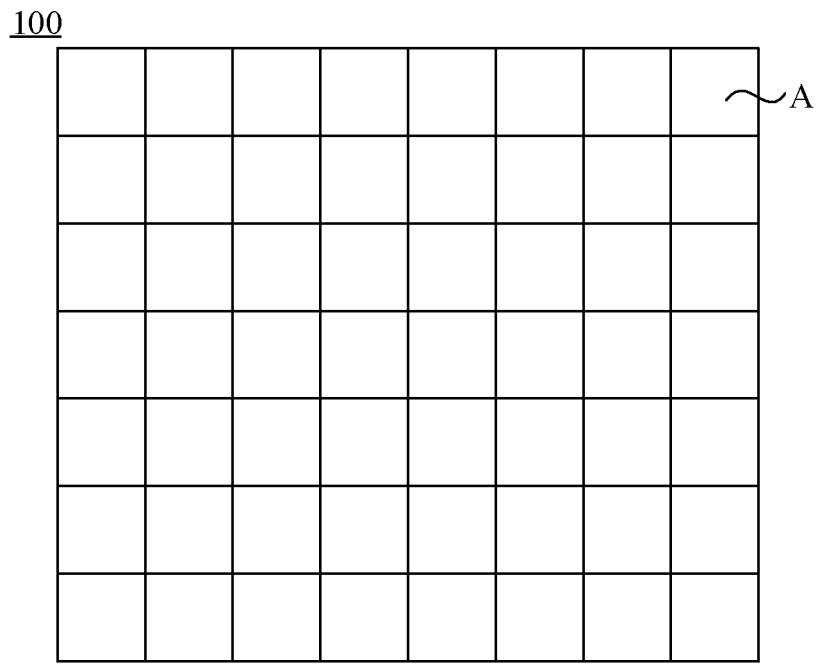
FIG. 1 is a structural diagram of a ray detector substrate, in accordance with some embodiments of the present disclosure.

Technical solutions in some embodiments of the present disclosure will be described clearly and completely below with reference to the accompanying drawings.

However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive meaning, i.e., "including, but not limited to". In the description of the specification, the terms such as "one embodiment", "some embodiments", "exemplary embodiments", "example", "specific example" and "some examples" are intended to indicate that specific features, structures, materials or characteristics related to the embodiment(s) or example(s) are included in at least one embodiment or example of the present disclosure. Schematic representation of the above terms do not necessarily refer to the same embodiment(s) or examples(s). In addition, the specific features, structures, materials or characteristics may be included in any one or more embodiments or examples in any suitable manner.

Hereinafter, the terms "first" and "second" are only used for descriptive purposes, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "multiple", "a plurality of" or "the plurality of" means two or more unless otherwise specified.

In the description of some embodiments, the term "connected" and derivatives thereof may be used. For example, the term "connected" may be used in the description of some embodiments to indicate that two or more components are in direct physical or electrical contact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, depending on the context, the phrase "if it is determined that" or "if [a stated condition or event] is detected" is optionally construed as "in a case where it is determined that", "in response to determining that", "in a case where [the stated condition or event] is detected", or "in response to detecting [the stated condition or event]".

The phase "suitable for" or "configured to" as used herein means an open and inclusive expression, which does not exclude devices that are applicable to or configured to perform additional tasks or steps.

In addition, the use of the phase "based on" is meant to be open and inclusive, since a process, step, calculation or other action that is "based on" one or more of the stated conditions or values may, in practice, be based on additional conditions or value beyond those stated.

As used herein, the terms such as "about" or "approximately" includes a stated value and an average value within an acceptable range of deviation of a particular value. The acceptable range of deviation is determined by a person of ordinary skill in the art in view of the measurement in question and the error associated with the measurement of a particular quantity (i.e., limitations of the measurement system).

Exemplary embodiments are described herein with reference to sectional views and/or plan views as idealized exemplary drawings. In the drawings, thickness of layers and sizes of regions are enlarged for clarity. Variations in shape relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown in a rectangular shape generally has a curved feature. Thus, the regions shown in the accompanying drawings are schematic in nature, and their shapes are not intended to show actual shapes of regions in a device, and are not intended to limit the scope of the exemplary embodiments.

The following description will be made by considering an example where the ray detector mentioned in the background is an X-ray detector.

In the related art, X-ray detectors mainly include direct-type amorphous selenium X-ray detectors and indirect-type amorphous silicon X-ray detectors.

The direct-type amorphous selenium X-ray detector is capable of directly converting X-rays into photocurrent. Here, in a process of detecting X-rays with the amorphous selenium X-ray detector and converting the X-rays into photocurrent (or electrical signals), a high voltage needs to be applied to the amorphous selenium to achieve high X-ray sensitivity, and acceptable lag and ghosting levels. However, it is easy to cause high dark current.

The indirect-type amorphous silicon X-ray detector converts X-rays into visible light, and then converts the visible light into an photocurrent. Here, the amorphous silicon X-ray detector generally includes a scintillator screen capable of converting the X-rays into the visible light, and a photodetector array capable of converting the visible light into the photocurrent. In a process of manufacturing the amorphous silicon X-ray detector, the scintillator screen and the photodetector array are required to be fabricated separately, and then the scintillator screen and the photodetector array are attached together, which results in a complicated manufacturing process of the amorphous silicon X-ray detector, and a low production efficiency. In addition, in the process of fabricating the scintillator screen and the photodetector array, structures such as through holes for electrical connection are required to be formed, so that a detective quantum efficiency (DQE) of the amorphous silicon X-ray detector is easy to be reduced.

Based on this, some embodiments of the present disclosure provide a ray detector substrate 100 (e.g., as shown in FIGS. 1 to 7). The ray detector substrate 100 is capable of detecting various types of rays. A structure and operation principle of the ray detector substrate 100 will be schematically described below by considering one of the various types of rays (i.e., X-rays) as an example.

In some examples, as shown in FIG. 1, the ray detector substrate 100 has a plurality of detection regions A. The plurality of detection regions A may be arranged, for example, in an array.

In some embodiments, as shown in FIGS. 2 to 7, the ray detector substrate 100 includes a substrate 1.

The base 1 may be of various types, which may be set according to actual needs.

For example, the substrate 1 may be a blank base substrate. For another example, the substrate 1 may include a blank base substrate and a functional film (e.g., a buffer layer) disposed on a surface of the blank base substrate.

The blank base substrate may be of various types. For example, the blank base substrate may be a polymethyl methacrylate (PMMA) base substrate or a glass base substrate.

Figure 2:
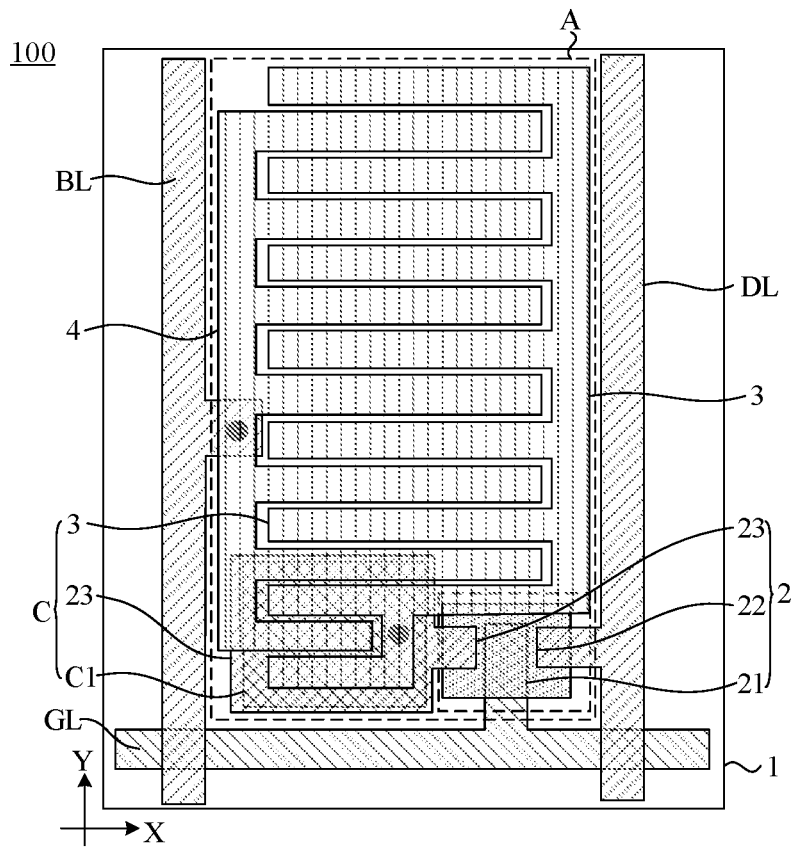
FIG. 2 is a structural diagram of another ray detector substrate, in accordance with some embodiments of the present disclosure.
Figure 3:
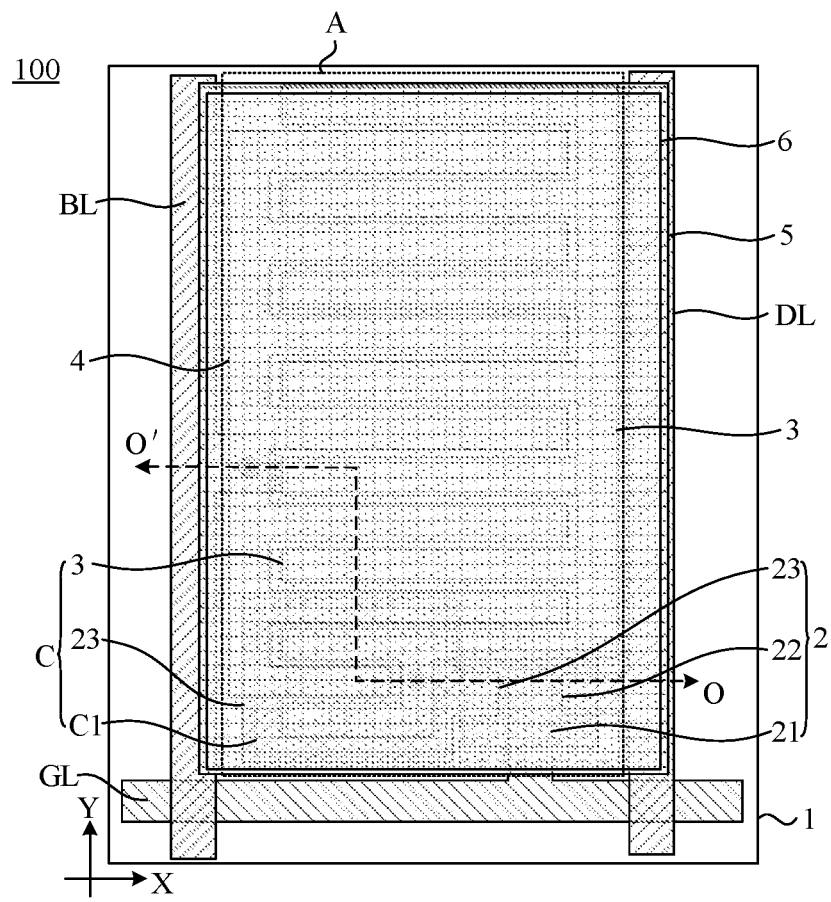
FIG. 3 is a structural diagram of yet another ray detector substrate, in accordance with some embodiments of the present disclosure.

In some embodiments, as shown in FIGS. 2 and 3, the ray detector substrate 100 further includes a plurality of gate lines GL disposed on a side of the substrate 1 and extending in a first direction X, and a plurality of data lines DL disposed on the side of the substrate 1 and extending in a second direction Y. For example, the plurality of data lines DL are disposed on a side of the plurality of gate lines GL away from the substrate 1, and the plurality of data lines DL are insulated from the plurality of gate lines GL.

In some examples, the plurality of gate lines GL and the plurality of data lines DL intersect to define the plurality of detection regions A, which means that the first direction X and the second direction Y intersect.

Here, an included angle between the first direction X and the second direction Y may be set according to actual needs. For example, the included angle between the first direction X and the second direction Y is 90°. That is, the plurality of gate lines GL and the plurality of data lines DL are perpendicular or approximately perpendicular to each other.

In some embodiments, as shown in FIGS. 2 to 7, the ray detector substrate 100 further includes a transistor 2 disposed on the side of the substrate 1 and located in each detection region A. For example, the transistor 2 is a thin film transistor including a gate 21, a source 22 and a drain 23.

The thin film transistor may be of various types, which may be set according to actual needs. For example, the thin film transistor may be an amorphous silicon thin film transistor, an oxide thin film transistor, or a low-temperature polysilicon thin film transistor.

In some examples, detection regions A arranged in a line in the first direction X may be referred to as detection regions A in a same row, and detection regions A arranged in a line in the second direction Y may be referred to as detection regions A in a same column. Transistors 2 in the detection regions A in the same row may be electrically connected to a same gate line GL, and transistors 2 in the detection regions A in the same column may be electrically connected to a same data line DL. Each transistor 2 may be electrically connected to a corresponding gate line GL through a gate 21 thereof, and electrically connected to a corresponding data line DL through one of a source 22 and a drain 23 (e.g., a source 22) thereof.

Of course, the transistors 2 in the detection regions A in the same row may also be electrically connected to multiple gate lines GL, which will not be limited in the embodiments of the present disclosure.

In some embodiments, as shown in FIGS. 2 and 3, the ray detector substrate 100 further includes a plurality of bias voltage signal lines BL disposed in a same layer as the plurality of data lines DL and extending in the second direction Y.

It will be noted that, the "same layer" mentioned herein refers to a layer structure formed by a film layer for forming a specific pattern by a same film forming process and then by one patterning process using a same mask. Depending on the different specific patterns, a single patterning process may include several exposure, development or etching processes, the specific patterns in the formed layer structure may be continuous or discontinuous, and these specific patterns may also be at different heights or have different thicknesses. In this way, the plurality of data lines DL and the plurality of bias voltage signal lines BL may be formed simultaneously, which is beneficial to simplifying the manufacturing process of the ray detector substrate 100.

In addition, the source 22 and the drain 23 of each transistor 2, and the data lines DL may also be arranged in a same layer. In this way, the source 22, the drain 23, the data lines DL and the bias voltage signal lines BL may be formed simultaneously by one patterning process, which is beneficial to simplifying the manufacturing process of the ray detector substrate 100.

In some embodiments, as shown in FIGS. 2 to 7, the ray detector substrate 100 further includes a first interdigital electrode 3 and a second interdigital electrode 4 disposed on the side of the substrate 1 and located in each detection region A.

For example, as shown in FIGS. 2 to 7, the first interdigital electrode 3 and the second interdigital electrode 4 are disposed on a side of the plurality of data lines DL and the plurality of bias voltage signal lines BL away from the substrate 1.

A material of the first interdigital electrode 3 may be various, and a material of the second interdigital electrode 4 may be various. For example, the material of the first interdigital electrode 3 includes gold (Au), aluminum (Al), molybdenum (Mo), or an alloy composed of at least two of Au, Al and Mo; and the material of the second interdigital electrode 4 includes Au, Al, Mo, or an alloy composed of at least two of the three.

The first interdigital electrode 3 and the second interdigital electrode 4 each may be of various structures. For example, the first interdigital electrode 3 may be a single layer of film, or may be composed of a plurality of layers of films stacked in sequence; and the second interdigital electrode 4 may be a single layer of film, or may be composed of a plurality of layers of films stacked in sequence.

In some examples, as shown in FIGS. 2 to 7, the first interdigital electrode 3 is electrically connected to another of the source 22 and the drain 23 of the transistor 2 other than the one electrically connected to the data line DL. The second interdigital electrode 4 is electrically connected to a bias voltage signal line BL.

For example, in a case where the source 22 of the transistor 2 is electrically connected to the data line DL, the first interdigital electrode 3 may be electrically connected to the drain 23 of the transistor 2; and in a case where the drain 23 of the transistor 2 is electrically connected to the data line DL, the first interdigital electrode 3 may be electrically connected to the source 22 of the transistor 2.

As shown in FIGS. 2 to 7, second interdigital electrodes 4 in the detection regions A in the same column may be, for example, electrically connected to a same bias voltage signal line BL.

Figure 8:
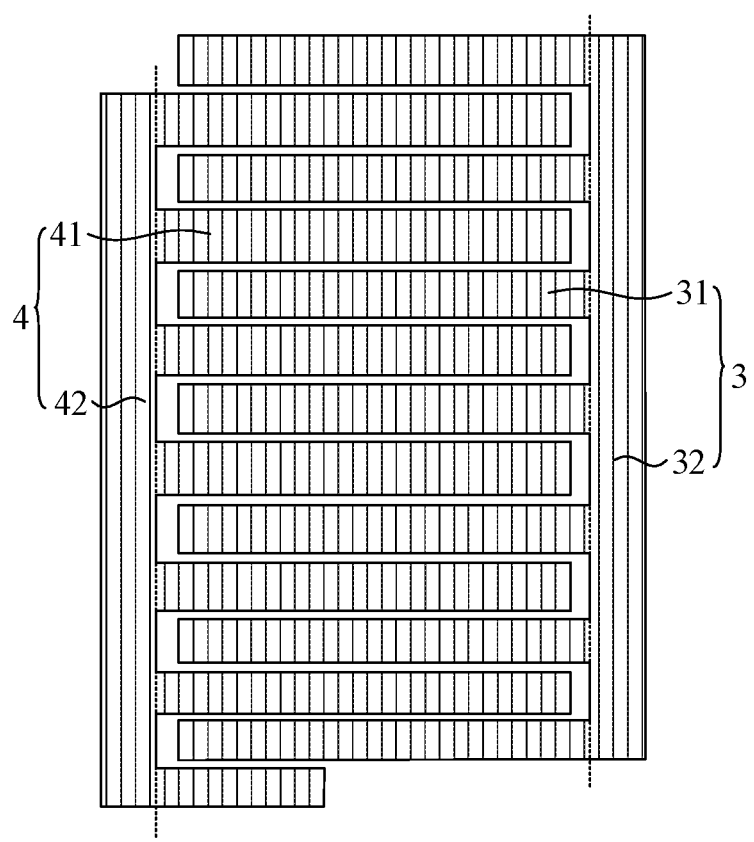
FIG. 8 is a structural diagram of a first interdigital electrode and a second interdigital electrode, in accordance with some embodiments of the present disclosure.

In some examples, as shown in FIG. 8, the first interdigital electrode 3 includes a plurality of first electrode fingers 31 and a first connection portion 32 electrically connected to the plurality of first electrode fingers 31. The second interdigital electrode 4 includes a plurality of second electrode fingers 41 and a second connection portion 42 electrically connected to the plurality of second electrode fingers 41.

For example, as shown in FIG. 8, the first connection portion 32 and the second connection portion 42 are parallel or substantially parallel to each other. The plurality of first electrode fingers 31 and the plurality of second electrode fingers 41 are disposed between the first connection portion 32 and the second connection portion 42, and are alternately arranged in sequence in an extension direction of the first connection portion 32 or the second connection portion 42.

Figure 9:
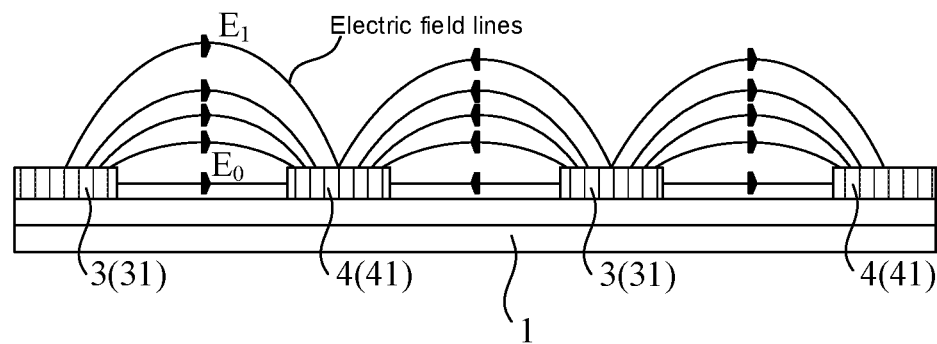
FIG. 9 is a distribution diagram of electric field lines of an electric field between a first interdigital electrode and a second interdigital electrode, in accordance with some embodiments of the present disclosure.

In this way, in a case where the transistor 2 transmits an operating voltage to the first interdigital electrode 3, and the bias voltage signal line BL transmits a bias voltage to the second interdigital electrode 4, if there is a voltage difference between the first interdigital electrode 3 and the second interdigital electrode 4 (for example, the operating voltage of the first interdigital electrode 3 is 5 V, and the bias voltage of the second interdigital electrode 4 is −6 V), as shown in FIG. 9, an electric field may be developed between each adjacent first electrode finger 31 and second electrode finger 41. The electric field developed between the adjacent first electrode finger 31 and second electrode finger 41 is a non-uniform electric field, and an electric field strength of the electric field gradually decreases in a direction perpendicular to the substrate 1 and away from the substrate 1. For example, as shown in FIG. 9, an electric field strength E0 at a spatial position proximate to the first interdigital electrode 3 and the second interdigital electrode 4 is greater than an electric field strength E1 at a spatial position away from the first interdigital electrode 3 and the second interdigital electrode 4.

In some examples, an included angle between each first electrode finger 31 and the first connection portion 32 may be set according to actual needs. For example, the first electrode finger 31 and the first connection portion 32 are perpendicular to each other. An included angle between each second electrode finger 41 and the second connection portion 42 may be set according to actual needs. For example, the second electrode finger 41 and the second connection portion 42 are perpendicular to each other. In a case where each first electrode finger 31 and the first connection portion 32 are perpendicular to each other, and each second electrode finger 41 and the second connection portion 42 are perpendicular to each other, it is beneficial to reduce an area of the detection region A, increase the number of detection regions A of the ray detector substrate 100, and improve a resolution of the ray detector substrate 100.

In some embodiments, as shown in FIGS. 3 to 7, the ray detector substrate 100 further includes a first scintillator layer 5 disposed on a side of the first interdigital electrode 3 and the second interdigital electrode 4 away from the substrate 1, and a second scintillator layer 6 disposed on a side of the first scintillator layer 5 away from the substrate 1.

Figure 4:
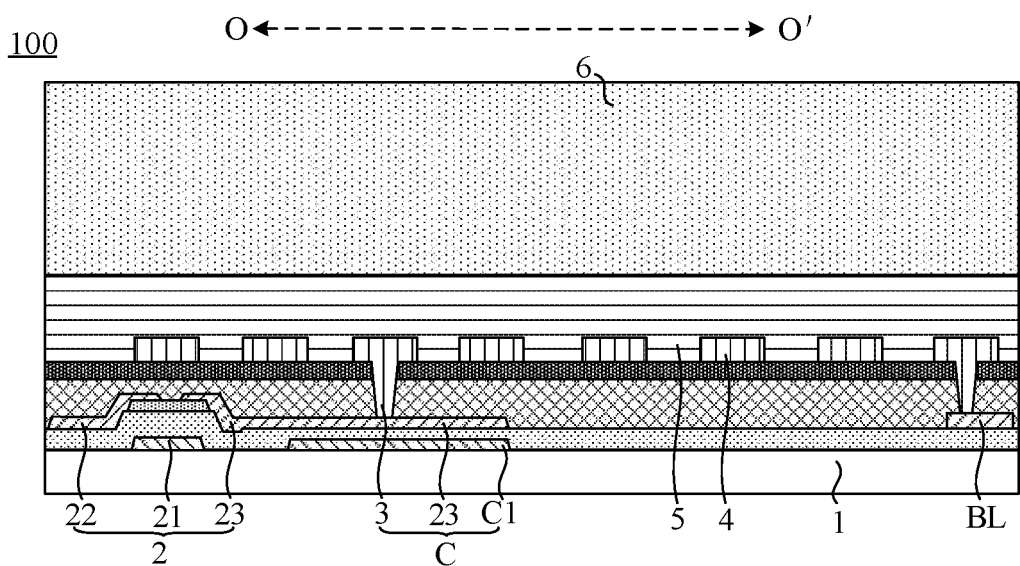
FIG. 4 is a sectional view of the ray detector substrate shown in FIG. 3 taken along the O-O' direction.
Figure 5:
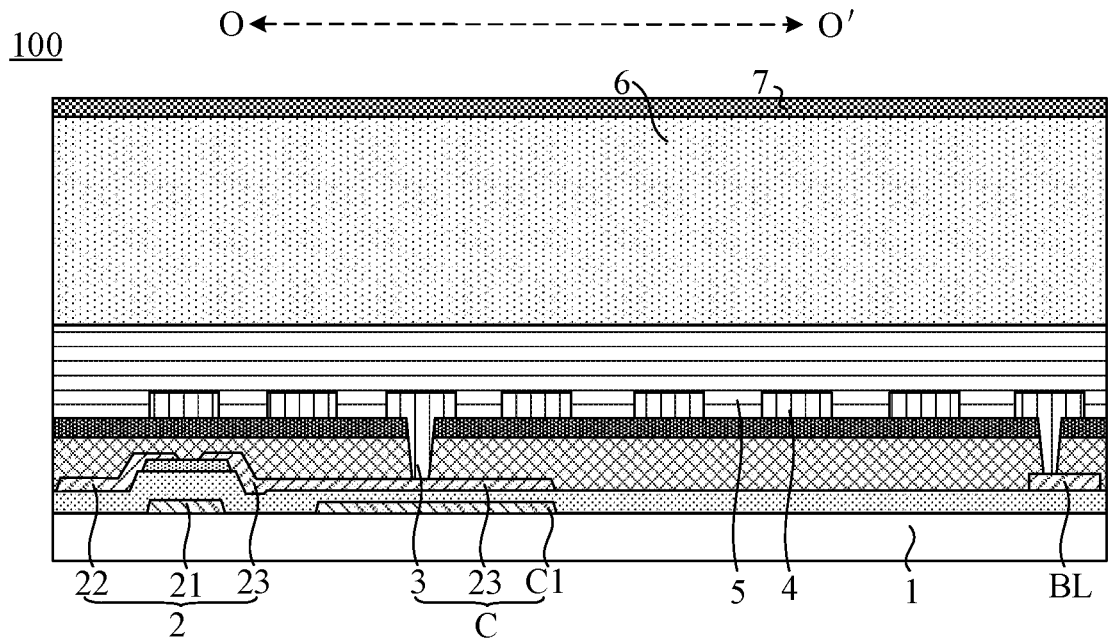
FIG. 5 is another sectional view of the ray detector substrate shown in FIG. 3 taken along the O-O' direction.

In some examples, as shown in FIGS. 4 and 5, the first scintillator layer 5 is disposed on surfaces of the first interdigital electrode 3 and the second interdigital electrode 4 away from the substrate 1. That is, the first scintillator layer 5 is in direct contact with the first interdigital electrode 3, and the first scintillator layer 5 is also in direct contact with the second interdigital electrode 4. In this case, the first scintillator layer 5 covers the first interdigital electrode 3 and the second interdigital electrode 4 and fills a gap between the first interdigital electrode 3 and the second interdigital electrode 4.

Of course, other films may also be provided between the first scintillator layer 5 and the first interdigital electrode 3 and between the first scintillator layer 5 and the second interdigital electrode 4. For the films disposed between the first scintillator layer 5 and the first interdigital electrode 3 and between the first scintillator layer 5 and the second interdigital electrode 4, reference may be made to the descriptions in the following embodiments.

In some examples, as shown in FIGS. 4 to 5, a surface of the first scintillator layer 5 away from the substrate 1 is a relatively flat surface. The second scintillator layer 6 is disposed on the surface of the first scintillator layer 5 away from the substrate 1, and the first scintillator layer 5 and the second scintillator layer 6 are in direct contact. The second scintillator layer 6 is of a relatively flat structure.

A material of the first scintillator layer 5 is a semiconductor material, and a material of the second scintillator layer 6 is a semiconductor material. In this case, the first interdigital electrode 3, the second interdigital electrode 4 and the first scintillator layer 5 may constitute a metal-semiconductor-metal (MSM) structure; alternatively, the first scintillator layer 5 and the second scintillator layer 6 may be regarded as a one-piece structure, and the first interdigital electrode 3, the second interdigital electrode 4, the first scintillator layer 5 and the second scintillator layer 6 together constitute an MSM structure.

In some examples, the second scintillator layer 6 is configured to convert part of X-rays incident onto the detection region A into visible light, and transmit another part of the X-rays, so that the another part of the X-rays is incident onto the first scintillator layer 5 through the second scintillator layer 6. The first scintillator layer 5 is configured to convert the visible light converted by the second scintillator layer 6 and the another part of the X-rays through the second scintillator layer 6 into photocurrent.

Figure 10:
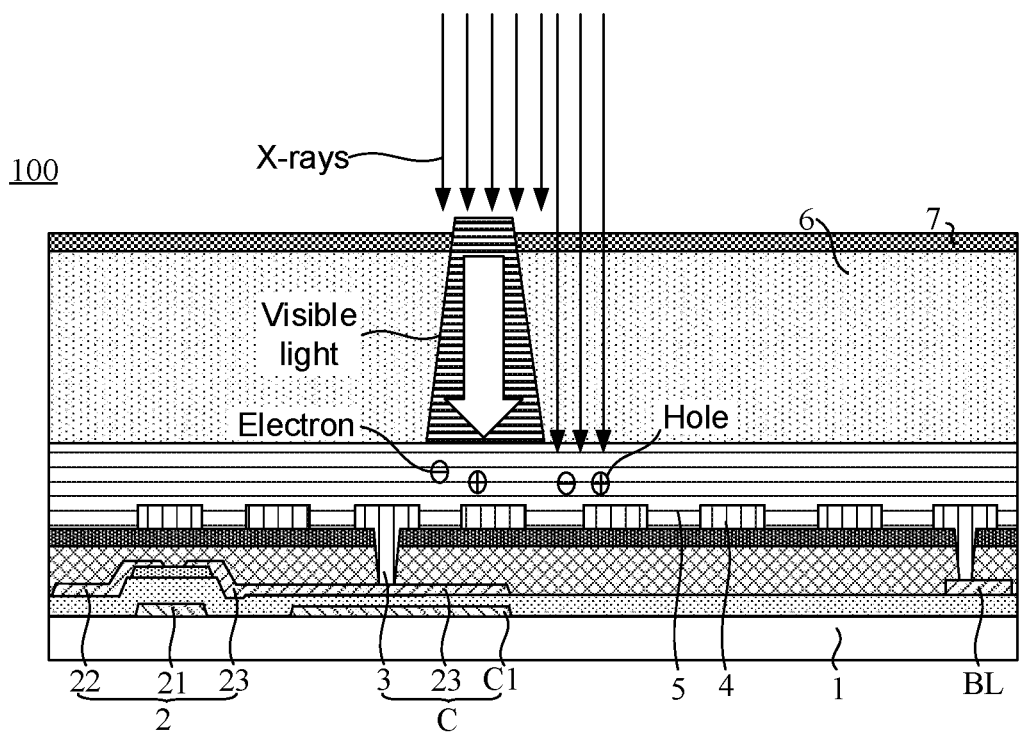
FIG. 10 is a diagram showing an operation principle of a ray detector substrate, in accordance with some embodiments of the present disclosure.

As shown in FIG. 10, an operation principle of the ray detector substrate 100 will be schematically described below by considering an example where a first interdigital electrode 3 is electrically connected to a drain 23 of a corresponding transistor 2 and a second interdigital electrode 4 is electrically connected to a corresponding bias voltage signal line BL.

First, the transistor 2 is turned on and transmits an operating voltage to the first interdigital electrode 3, and the bias voltage signal line BL transmits a bias voltage to the second interdigital electrode 4, so that an electric field is developed between the first interdigital electrode 3 and the second interdigital electrode 4. For example, the operating voltage is a positive voltage, and the bias voltage is a negative voltage.

The electric field developed between the first interdigital electrode 3 and the second interdigital electrode 4 is a non-uniform electric field, and the second scintillator layer 6 is farther away from the first interdigital electrode 3 and the second interdigital electrode 4 than the first scintillator layer 5. Thus, an electric field strength at a spatial position where the second scintillator layer 6 is located is less than an electric field strength at a spatial position where the first scintillator layer 5 is located.

Next, the transistor 2 is turned off, and X-rays are incident onto the second scintillator layer 6. At this time, the electric field developed between the first interdigital electrode 3 and the second interdigital electrode 4 still exists.

For example, the electric field strength at the spatial position where the second scintillator layer 6 is located is small, and the electric field strength is not strong enough to satisfy conditions for direct conversion of X-rays into photocurrent. That is, the electric field strength is not strong enough to collect photogenerated charges. In this case, due to action of an electric field with a small electric field strength, the part of the X-rays is absorbed by the second scintillator layer 6 and converted into the visible light by the second scintillator layer 6, and the another part of the X-rays is not absorbed and converted by the second scintillator layer 6, but directly passes through the second scintillator layer 6 and is incident onto the first scintillator layer 5. The visible light converted by the second scintillator layer 6 and the another part of the X-rays directly passing through the second scintillator layer 6 propagate to the first scintillator layer 5.

For example, the electric field strength at the spatial position where the first scintillator layer 5 is located is large (e.g., the electric field strength is greater than or equal to 10 kV/m), and the electric field strength satisfies the conditions for direct conversion of X-rays into photocurrent. Since an electric field strength required for the conversion of visible light into photocurrent is less than an electric field strength required for the conversion of X-rays into photocurrent, a spatial region where X-rays are directly converted into photocurrent is also be a spatial region where the visible light is converted into photocurrent. In this case, due to action of an electric field with a large electric field strength, the visible light converted by the second scintillator layer 6 and the another part of the X-rays directly passing through the second scintillator layer 6 are directly converted into photocurrent by the first scintillator layer 5. Subsequently, the photocurrent is read, so that detection of the X-rays may be achieved.

In a case where the part of the X-rays is converted into the visible light by the second scintillator layer 6, and the visible light is converted into photocurrent by the first scintillator layer 5, an indirect detection of the X-rays may be achieved. In a case where the another part of the X-rays directly passes through the second scintillator layer 6 and is converted into photocurrent by the first scintillator layer 5, a direct detection of the X-rays may be achieved. This means that the ray detector substrate 100 provided in the embodiments of the present disclosure achieves both the direct detection of X-rays and the indirect detection of X-rays.

Therefore, in the ray detector substrate 100 provided in some embodiments of the present disclosure, the first interdigital electrode 3 and the second interdigital electrode 4 that are interdigitated with each other are provided in each detection region A, and the first scintillator layer 5 and the second scintillator layer 6 are sequentially disposed on the side of first interdigital electrode 3 and the second interdigital electrode 4 away from the substrate 1. In this way, the first interdigital electrode 3 and the second interdigital electrode 4 may be used to develop the non-uniformity electric field, and the second scintillator layer 6 may convert the part of the X-rays incident onto the detection region A into the visible light due to the action of the electric field with the small electric field strength; the first scintillator layer 5 may directly convert the visible light and the another part of the X-rays passing through the second scintillator layer 6 into photocurrent due to the action of the electric field with the large electric field strength. Therefore, the ray detector substrate 100 realizes both the direct detection of the X-rays and the indirect detection of the X-rays.

Moreover, on the basis of using the second scintillator layer 6 to convert the part of the X-rays incident onto the detection region A into the visible light, the first scintillator layer 5 needs to convert the remaining part of the X-rays into photocurrent, which is beneficial to reducing values of voltages transmitted to the first interdigital electrode 3 and the second interdigital electrode 4, thereby reducing the dark current.

In addition, in the embodiments of the present disclosure, the first scintillator layer 5 and the second scintillator layer 6 are disposed on the side of the first interdigital electrode 3 and the second interdigital electrode 4 away from the substrate 1. In this way, in the process of manufacturing the ray detector substrate 100, the first scintillator layer 5 and the second scintillator layer 6 are directly formed on the side of the first interdigital electrode 3 and the second interdigital electrode 4 away from the substrate 1. As a result, the ray detector substrate 100 may be obtained without a need to fabricate the first scintillator layer 5 and the second scintillator layer 6 separately. In this case, it is beneficial to improve integration of the ray detector substrate 100, reduce the complexity of the manufacturing process of the ray detector substrate 100, and improve the production efficiency. In addition, in a process of forming the first scintillator layer 5 and the second scintillator layer 6, no other mask process is needed, structures such as through holes are not required to be formed, and there is no need to form a film to shield the second scintillator layer 6 on a side of the second scintillator layer 6 away from the substrate 1. In this case, it is beneficial to reduce cost of manufacturing the ray detector substrate 100, improve a fill factor of the ray detector substrate 100, and improve the DQE and a value of modulation transfer function (MTF) of the ray detector substrate 100.

The material of the first scintillator layer 5 is various, and the material of the second scintillator layer 6 is various, which may be set according to actual needs.

In some embodiments, the material of the first scintillator layer 5 includes a first perovskite material, and the material of the second scintillator layer 6 includes a second perovskite material. The first perovskite material is capable of converting X-rays into visible light due to action of an electric field with a small electric field strength, and the second perovskite material is capable of converting visible light or X-rays into photocurrent due to action of an electric field with a large electric field strength.

In some examples, the first perovskite material includes a first perovskite nanocrystalline material, and a particle size of the first perovskite nanocrystalline material may be in a range of 3 nm to 30 nm, inclusive. For example, the particle size of the first perovskite nano-crystalline material may be 3 nm, 9 nm, 15 nm, 18 nm, 25 nm or 30 nm.

For example, a chemical formula of the first perovskite nanocrystalline material may be expressed as $CsPbX_3$. Here, X represents halogen element(s), and the halogen element(s) include at least one of chlorine (Cl), bromine (Br) and iodine (I). For example, the first perovskite material may be $CsPbCl_3$, $CsPbCl_1Br_2$, $CsPbBr_3$, or $CsPbBr_1I_2$.

In some examples, the second perovskite material includes a second perovskite nanocrystalline material, and a particle size of the second perovskite nanocrystalline material may be in a range of 3 nm to 30 nm, inclusive. For example, the particle size of the second perovskite nanocrystalline material may be 3 nm, 8 nm, 16 nm, 20 nm, 25 nm or 30 nm.

For example, a chemical formula of the second perovskite material may be expressed as $CsPbX_3$. Here, X represents halogen element(s), and the halogen element(s) include at least one of chlorine, bromine and iodine. For example, the second perovskite material may be $CsPbCl_1Br_2$, $CsPbBr_3$, $CsPbBr_1I_2$, or $CsPbI_3$.

The halogen element of the first perovskite material and the halogen element of the second perovskite material may be different or the same, which may be set according to actual needs.

In some examples, the halogen element of the first perovskite material and the halogen element of the second perovskite material may be different.

Based on this, a band gap of the first scintillator layer 5 is less than a band gap of the second scintillator layer 6.

Figure 11:
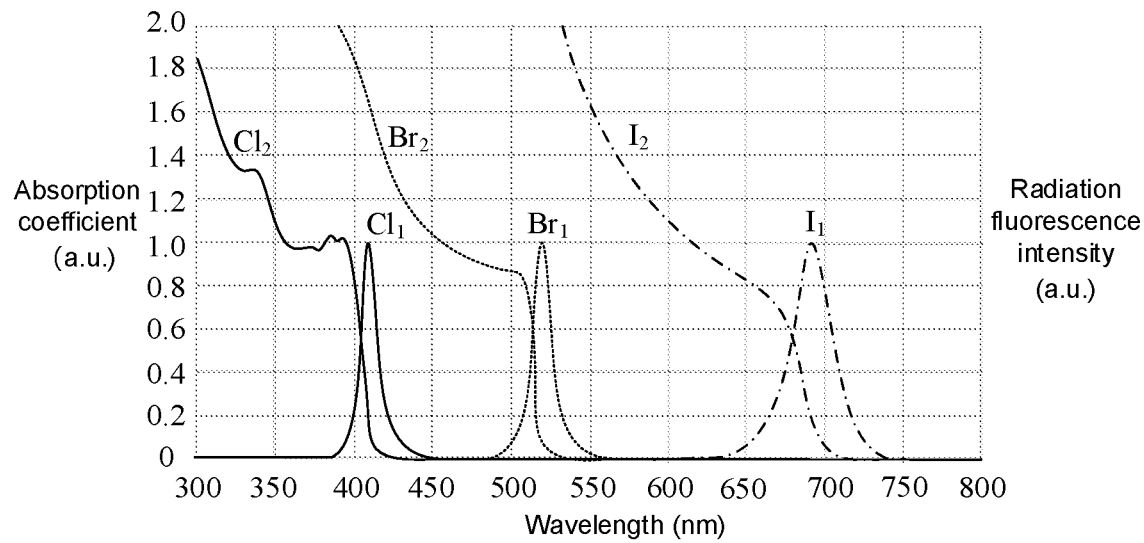
FIG. 11 is a diagram showing radiation fluorescence spectrums and absorption spectrums of perovskite materials, in accordance with some embodiments of the present disclosure.

As shown in FIG. 11, FIG. 11 shows absorption spectrums and radiation fluorescence spectrums of three different single-halogen perovskite materials, the sign $C_1$ represents a radiation fluorescence spectrum of $CsPbCl_3$, the sign $Cl_2$ represents an absorption spectrum of $CsPbCl_3$, the sign $Br_1$ represents a radiation fluorescence spectrum of $CsPbBr_3$, the sign $Br_2$ represents an absorption spectrum of $CsPbBr_3$, the sign $I_1$ represents a radiation fluorescence spectrum of $CsPbI_3$, and the sign 12 represents a radiation fluorescence spectrum of $CsPbCl_3$.

It can be seen from FIG. 11 that, perovskite materials including different halogen elements have different wavelength absorption ranges and radiation fluorescence peaks. A perovskite material with halogen element(s) including only Cl has the largest band gap and a fluorescence peak with the shortest wavelength, and a perovskite material with halogen element(s) including only I has the smallest band gap and a fluorescence peak with the longest wavelength. A band gap of a perovskite material with halogen element(s) including only Br is less than the band gap of the perovskite material with the halogen element(s) including only Cl, and a band gap of a perovskite material with halogen element(s) including both Cl and Br is between the band gap of the perovskite material with the halogen element(s) including only Cl and the band gap of the perovskite material with the halogen element(s) including only Br. Moreover, fluorescent radiation of a perovskite material with a large band gap may be absorbed by a perovskite material with a small band gap, so as to achieve photoelectric conversion. On the contrary, fluorescent radiation of a perovskite material with a small band gap cannot be absorbed by a perovskite material with a large band gap.

By setting the band gap of the first scintillator layer 5 to be less than the band gap of the second scintillator layer 6, it may be ensured that the visible light converted from the X-rays by the second scintillator layer 6 is absorbed and converted by the first scintillator layer 5, so as to ensure that the ray detector substrate 100 realizes both the indirect detection of X-rays and the direct detection of X-rays.

For example, the material of the first scintillator layer 5 may be $CsPbI_3$, and the material of the second scintillator layer 6 may be $CsPbBr_3$, $CsPbCl_3$, or $CsPbCl_aBr_b$ (where a sum of a and b is equal to 3 (a+b=3)). Alternatively, the material of the first scintillator layer 5 may be $CsPbBr_3$, and the material of the second scintillator layer 6 may be CsPbCl$_3$. Of course, the material of the first scintillator layer 5 and the material of the second scintillator layer 6 may also be selected otherwise, and the material of the first scintillator layer 5 and the material of the second scintillator layer 6 described here are only as an example.

In some other examples, the halogen element of the first perovskite material and the halogen element of the second perovskite material may be the same.

For example, the first perovskite material and the second perovskite material are different materials, and the band gap of the first scintillator layer 5 is less than the band gap of the second scintillator layer 6.

For example, the material of the first scintillator layer 5 includes CsPbI$_{2.5}$Br$_{0.5}$, and the material of the second scintillator layer 6 includes CsPbI$_{0.5}$Br$_{2.5}$.

In this way, it may ensure that the visible light converted from the X-rays by the second scintillator layer 6 is absorbed and converted by the first scintillator layer 5, and in turn, it may ensure that the ray detector substrate 100 realizes both the indirect detection of the X-rays and the direct detection of the X-rays.

For example, the first perovskite material and the second perovskite material are the same material, and the band gap of the first scintillator layer 5 is equal to the band gap of the second scintillator layer 6.

For example, the material of the first scintillator layer 5 and the material of the second scintillator layer 6 are both CsPbI$_3$. In this case, it may be considered that the first scintillator layer 5 and the second scintillator layer 6 are of a one-piece structure, and a boundary between the first scintillator layer 5 and the second scintillator layer 6 may be determined according to the electric field strength of the electric field developed between the first interdigital electrode 3 and the second interdigital electrode 4.

For example, an electric field strength at a certain spatial position is $E_{boundary}$; in a case where an electric field strength is less than the $E_{boundary}$, it is possible for the perovskite material to convert X-rays into visible light, but it is difficult for the perovskite material to convert X-rays into photocurrent; and in a case where an electric field strength is greater than the $E_{boundary}$, it is possible for the perovskite material to convert X-rays into photocurrent. Thus, the spatial position at which the electric field strength is the $E_{boundary}$ is a position of the boundary between the first scintillator layer 5 and the second scintillator layer 6.

In this way, the visible light converted from the X-rays by the second scintillator layer 6 may be absorbed and converted by the first scintillator layer 5, so as to ensure that the ray detector substrate 100 realizes both the indirect detection of the X-rays and the direct detection of the X-rays.

It will be noted that, in the indirect-type amorphous silicon X-ray detector described above, a scintillator material of the scintillator screen has a generally large thickness (e.g., the thickness is within a range of 300 μm to 800 μm, inclusive), so that the scintillator screen is able to perform relatively complete or complete absorption and conversion of X-rays incident onto the scintillator screen. However, the scintillator material has a certain scattering effect on the visible light, which causes that the DQE of the indirect amorphous silicon X-ray detector is prone to be reduced.

However, the ray detector substrate 100 provided in the embodiments of the present disclosure realizes both the direct detection and the indirect detection of the X-rays, which means that a thickness of the second scintillator layer 6 capable of converting X-rays into visible light in the embodiments of the present disclosure is less than the thickness of the scintillator material of the scintillator screen. Thus, it is beneficial to reduce an influence of the second scintillator layer 6 on the scattering of the visible light and improve the DQE of the ray detector substrate 100.

In addition, compared with the indirect-type amorphous silicon X-ray detector, the perovskite material has higher absorption coefficient and conversion efficiency for X-rays. This means that, the thickness of the second scintillator layer 6 is smaller in a case of absorbing the same amount of X-rays. Therefore, it is beneficial to further reduce the influence of the second scintillator layer 6 on the scattering of the visible light and further improve the DQE of the ray detector substrate 100.

In some embodiments, a thickness of the first scintillator layer 5 (i.e., a dimension of the first scintillator layer 5 in a direction perpendicular to the substrate 1) is less than the thickness of the second scintillator layer 6 (i.e., a dimension of the second scintillator layer 6 in the direction perpendicular to the substrate 1).

By setting a relationship between the thickness of the first scintillator layer 5 and the thickness of the second scintillator layer 6, it may not only ensure that a leakage current of the ray detector substrate 100 is small, but also improve a utilization rate of the X-rays, and ensure that the first scintillator layer 5 and the second scintillator layer 6 can collectively generate a large photocurrent.

The thickness of the first scintillator layer 5 and the thickness of the second scintillator layer 6 may be set according to actual needs.

For example, the thickness of the first scintillator layer 5 is in a range of 0.1 μm to 20 μm, inclusive; and the thickness of the second scintillator layer 6 is in a range of 30 μm to 300 μm, inclusive.

For example, the thickness of the first scintillator layer 5 is 0.1 μm, 5 μm, 10 μm, 13 μm, 18 μm, or 20 μm; and the thickness of the second scintillator layer 6 is 20 μm, 50 μm, 90 μm, 120 μm, 170 μm, 200 μm, 250 μm, or 300 μm.

By setting the thickness of the first scintillator layer 5 and the thickness of the second scintillator layer 6 to be in the above ranges, the thickness of the first scintillator layer 5 is small and the thickness of the second scintillator layer 6 is large, which may avoid the large leakage current, and increase the utilization rate of the X-rays by using the second scintillator layer 6. Therefore, it is ensured that the first scintillator layer 5 and the second scintillator layer 6 are able to create a large photocurrent and obtain a large signal amount, and a good X-ray detection effect of the ray detector substrate 100 is guaranteed.

In some examples, different operating modes may be realized by adjusting the operating voltage transmitted to the first interdigital electrode 3 and/or adjusting the bias voltage transmitted to the second interdigital electrode 4.

For example, the operating voltage transmitted to the first interdigital electrode 3 and the bias voltage transmitted to the second interdigital electrode 4 are small, and the electric field strength of the electric field developed between the first interdigital electrode 3 and the second interdigital electrode 4 is small. In this case, the thickness of the first scintillator layer 5 may be small, and the thickness of the second scintillator layer 6 may be large. That is, for X-rays incident onto the ray detector substrate 100, part of the X-rays that is converted into the visible light is large, and another part of the X-rays that is directly converted into photocurrent is small. In this case, the indirect detection of the X-rays accounts for a large proportion, and the direct detection of the X-rays accounts for a small proportion. As a result, a high-sensitivity operating mode of the ray detector substrate 100 may be realized.

For example, a voltage difference between the operating voltage transmitted to the first interdigital electrode 3 and the bias voltage transmitted to the second interdigital electrode 4 may be in a range of 2 V to 20 V, inclusive.

For example, the operating voltage transmitted to the first interdigital electrode 3 and the bias voltage transmitted to the second interdigital electrode 4 are large, and the electric field strength of the electric field developed between the first interdigital electrode 3 and the second interdigital electrode 4 is large. In this case, the thickness of the first scintillator layer 5 may be large, and the thickness of the second scintillator layer 6 may be small. That is, a portion that is converted into the visible light of X-rays incident onto the ray detector substrate 100 is small, and another portion that is directly converted into photocurrent of the X-rays incident onto the ray detector substrate 100 is large. In this case, the indirect detection of the X-rays accounts for a small proportion, and the direct detection of the X-rays accounts for a large proportion. As a result, a high-resolution operating mode of the ray detector substrate 100 may be realized.

For example, the voltage difference between the operating voltage transmitted to the first interdigital electrode 3 and the bias voltage transmitted to the second interdigital electrode 4 may be in a range of 20 V to 200 V, inclusive.

Figure 6:
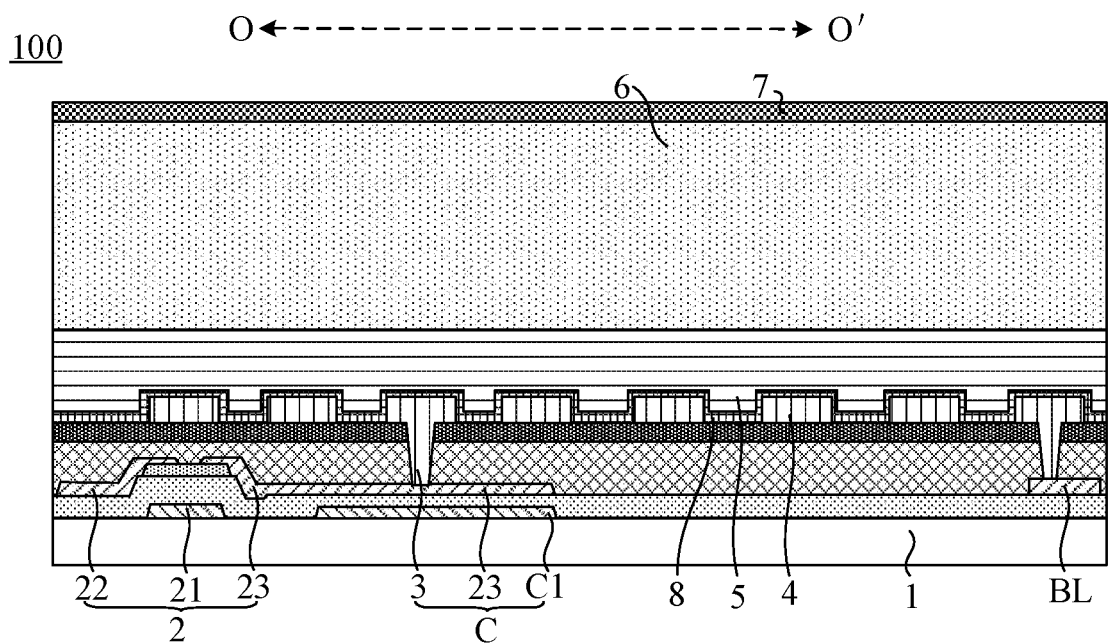
FIG. 6 is yet another sectional view of the ray detector substrate shown in FIG. 3 taken along the O-O' direction.
Figure 7:
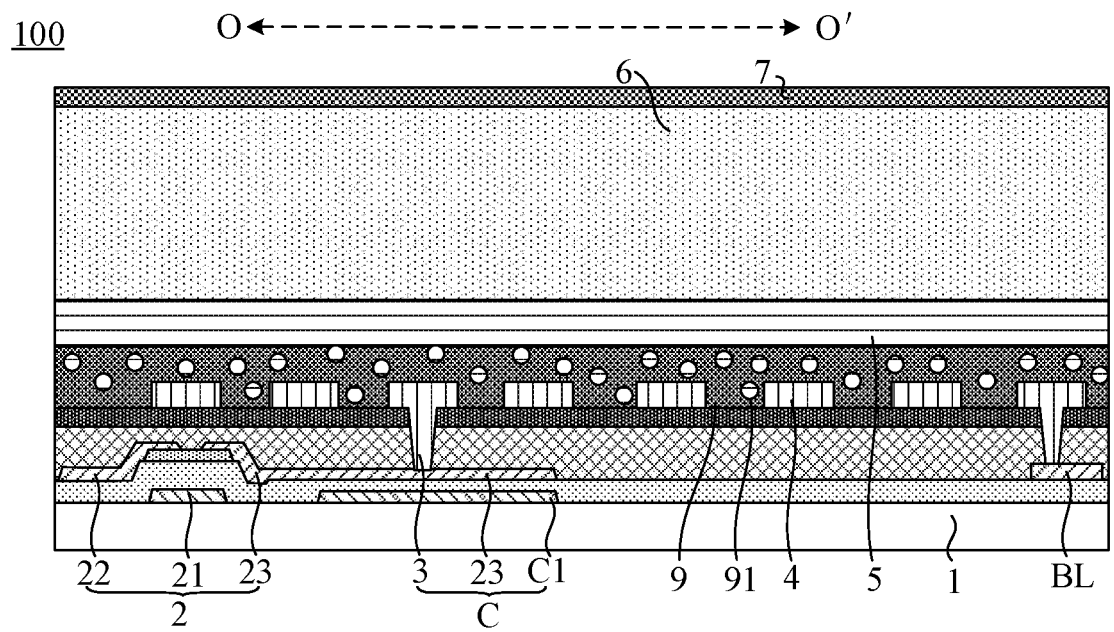
FIG. 7 is yet another sectional view of the ray detector substrate shown in FIG. 3 taken along the O-O' direction.

In some embodiments, as shown in FIGS. 5 to 7, the ray detector substrate 100 further includes a reflective layer 7 disposed on a side of the second scintillator layer 6 away from the substrate 1. The reflective layer 7 is configured to: transmit the X-rays, so that the X-rays are incident onto the second scintillator layer 6 through the reflection layer 7, and reflect the visible light that is converted by the second scintillator layer 6 and incident onto the reflective layer 7.

After the second scintillator layer 6 converts the part of the X-rays into the visible light, a propagation direction of the visible light may be arbitrary. By providing the reflective layer 7 on the side of the second scintillator layer 6 away from the substrate 1, in a case where the visible light propagates in the direction away from the substrate 1 and is incident onto the reflective layer 7, the visible light may be reflected to the first scintillator 5, so that the proportion of the visible light absorbed and converted by the first scintillator layer 5 is increased, and the DQE and the sensitivity of the ray detector substrate 100 is improved.

In some embodiments, the first scintillator layer 5 and the first interdigital electrode 3 further have other structures therebetween, and the first scintillator layer 5 and the second interdigital electrode 4 further have other structures therebetween. That is, the first scintillator layer 5 and the first interdigital electrode 3 are in indirect contact, and the first scintillator layer 5 and the second interdigital electrode 4 are in indirect contact.

Here, the structures between the first scintillator layer 5 and the first interdigital electrode 3 may be various, and the structures between the first scintillator layer 5 and the second interdigital electrode 4 may be various, which may be set according to actual needs.

In some examples, as shown in FIG. 6, the ray detector substrate 100 further includes an insulating layer 8 disposed on the side of the first interdigital electrode 3 and the second interdigital electrode 4 proximate to the first scintillator layer 5. For example, the insulating layer 8 may be in direct contact with the first interdigital electrode 3 and the second interdigital electrode 4, or may be in direct contact with the first scintillator layer 5.

The insulating layer 8 has a large band gap. For example, the band gap of the insulating layer 8 may be in a range of 4 eV to 9 eV, inclusive. For example, the band gap of the insulating layer 8 may be 4 eV, 4.6 eV (in this case, the insulating layer 8 is made of, for example, silicon nitride), 5 eV, 7 eV, or 9 eV.

Here, there is a Schottky barrier between the first scintillator layer 5 and the first interdigital electrode 3, and there is a Schottky barrier between the first scintillator layer 5 and the second interdigital electrode 4. By providing the insulating layer 8 on the side of the first interdigital electrode 3 and the second interdigital electrode 4 proximate to the first scintillator layer 5, a potential barrier may be added on the basis of the Schottky barrier to suppress recombination (i.e., recombination of electrons and holes) at a metal-semiconductor interface, so as to reduce the dark current, reduce the noise, and improve a signal-to-noise ratio of the ray detector substrate 100.

In some examples, a thickness of the insulating layer 8 (i.e., a dimension of the insulating layer 8 in the direction perpendicular to the substrate 1) may be set according to actual needs. For example, the thickness of the insulating layer 8 may be in a range of 1 nm to 10 nm, inclusive. For example, the thickness of the insulating layer 8 may be 1 nm, 2.5 nm, 5 nm, 8.1 nm, 9 nm, or 10 nm.

By setting the thickness of the insulating layer 8 to be in the above range, it is possible to ensure a suppression effect of the insulating layer 8 on the dark current, and avoid affecting the transmission of the photocurrent.

It will be noted that, the thickness of the insulating layer 8 may refer to, for example, an average thickness of the insulating layer 8, or may also refer to a maximum thickness or a minimum thickness of the insulating layer 8.

A material of insulating layer 8 may be various, as long as it has a large band gap and achieves an effect of reducing the dark current. For example, the material of the insulating layer 8 may include at least one of silicon nitride ($SiN_x$), an aluminum oxide ($AlO_x$), or a lead-containing compound (PbX).

In some other examples, as shown in FIG. 7, the ray detector substrate 100 further includes a mesoporous film 9 disposed on the side of the first interdigital electrode 3 and the second interdigital electrode 4 proximate to the first scintillator layer 5. For example, the mesoporous film 9 may be in direct contact with the first interdigital electrode 3 and the second interdigital electrode 4, or may be in direct contact with the first scintillator layer 5.

The mesoporous film 9 has a large band gap. For example, the band gap of the mesoporous film 9 may be 3.2 eV.

It will be noted that, the mesoporous film 9 has a suitable conduction band position and a valence band position, and has a low electron barrier and a high hole barrier, and the mesoporous film 9 may develop large potential barriers with the first interdigital electrode 3 and the second interdigital electrode 4. This means that, by providing the mesoporous film 9, electrons may be effectively conducted and holes may be effectively blocked. As a result, a recombination probability of electron-hole pairs at the interface may be effectively reduced, the dark current may be effectively reduced, the noise may be effectively reduced, and the signal-to-noise ratio of the ray detector substrate 100 may be improved.

In addition, photoelectric conversion characteristics of the first scintillator layer 5 are matched with the conduction band of the mesoporous film 9, so that photo-generated electrons in the converted photocurrent may be injected into the conduction band of the mesoporous film 9 to achieve the detection of the X-rays.

The mesoporous film 9 may be made of various materials, which may be set according to actual needs, as long as the above effect can be achieved. For example, the mesoporous film 9 may be made of a mesoporous material, and the mesoporous material may include at least one of a titanium oxide ($TiO_x$), a molybdenum oxide ($MoO_x$), a cobalt oxide ($CoO_x$), a zinc oxide (ZnO), a magnesium oxide (MgO), a tin oxide ($SnO_x$), a chromium oxide ($CrO_x$), or a cerium oxide ($CeO_x$).

In some examples, as shown in FIG. 7, the mesoporous film 9 has a plurality of mesopores 91. In this case, in a process of forming the first scintillator layer 5 on a side of the mesoporous film 9 away from the substrate 1, portions of the first scintillator layer 5 may fill the mesopores 91 of the mesoporous film 9, so that a contact area between of the first scintillator layer 5 and the mesoporous film 9 is increased, and injection amount and injection efficiency of the photo-generated electrons may be improved.

For example, a method for fabricating the mesoporous film 9 and the first scintillator layer 5 may include: preparing a dispersion liquid containing nano particles or micro particles of the material of the mesoporous film 9; providing the dispersion liquid on surfaces of the first interdigital electrode 3 and the second interdigital electrode 4 away from the substrate 1 to form a film through a spin coating process, a screen printing process or a slot coating process; sintering the film at a high temperature (e.g., the temperature may be in a range of 250° C. to 600° C.) to obtain the mesoporous film 9; and forming the first scintillator layer 5 on a surface of the mesoporous film 9 away from the substrate 1 through a deposition process. During the process of depositing the material of the first scintillator layer 5, part of the material of the first scintillator layer 5 will be naturally filled into the mesopores 91 of the mesoporous film 9.

In some examples, a thickness of the mesoporous film 9 (i.e. a dimension of the mesoporous film 9 in the direction perpendicular to the substrate 1) may be set according to actual needs. For example, the thickness of the mesoporous film 9 may be in a range of 0.1 μm to 100 μm, inclusive. For example, the thickness of the mesoporous film 9 may be 0.1 μm, 1 μm, 10 μm, 25.6 μm, 55.1 μm, 70 μm, 83 μm, or 100 μm.

By setting the thickness of the mesoporous film 9 to the above range, it may not only ensure a mesoporous effect of the mesoporous film 9 and a suppression effect of the mesoporous film 9 on the dark current, but also realize good filling of the mesopores 91 in the mesoporous film 9 by the first scintillator layer 5, so that the first scintillator layer 5 and the mesoporous film 9 have a large contact area, and thus the injection amount and the injection efficiency of the photo-generated electrons are guaranteed.

It will be noted that, the thickness of the mesoporous film 9 may refer to, for example, an average thickness of the mesoporous film 9, or may refer to a maximum thickness or a minimum thickness of the mesoporous film 9.

In some embodiments, as shown in FIGS. 2 to 7, the ray detector substrate 100 further includes a storage capacitor plate C1 disposed in the detection region A. For example, each detection region A may be provided with a storage capacitor plate C1.

In some examples, as shown in FIGS. 2 and 3, the storage capacitor plate C1 is arranged in the same layer as the plurality of gate lines GL. In this way, the plurality of gate lines GL and the storage capacitor plate C1 located in each detection region A may be formed simultaneously through one patterning process, thereby simplifying the manufacturing process of the ray detector substrate 100.

In some examples, as shown in FIGS. 2 to 7, in the same detection region A, the storage capacitor plate C1, the first interdigital electrode 3, and the source 22 or the drain 23 of the transistor 2 that is electrically connected to the first interdigital electrode 3 constitute a storage capacitor C.

For example, as shown in FIGS. 2 to 7, in the same detection region A, the first interdigital electrode 3 is electrically connected to the drain 23 of the transistor 2. In this case, the first interdigital electrode 3 and the drain 23 together constitute a electrode plate, and the electrode plate and the storage capacitor plate C1 constitute the storage capacitor C.

In the operation principle of the ray detector substrate 100, when the transistor 2 is turned off, and after the first scintillator layer 5 converts the visible light converted by the second scintillator layer 6 and the another part of the X-rays directly passing through the second scintillator layer 6 into photocurrent, the photocurrent charges the storage capacitor C, and charges of the photocurrent will be stored in the storage capacitor plate C1. After the charging of the storage capacitor C is completed, the transistor 2 may be turned on, so that the storage capacitor C is discharged through the transistor 2, the stored charges are read during the discharge process, and the detection of the X-rays is realized.

It will be noted that the transistor 2 is capable of storing a small amount of charges. Thus, by providing the storage capacitor plate C1 to obtain the storage capacitor C, the storage capacitor C may be used to store a large amount of charges, which is beneficial to ensuring that the ray detector substrate 100 realizes a good detection of the X-rays.

For example, a capacitance of the storage capacitor C may be in a range of 0.5 pF to 5 pF, inclusive.

Figure 12:
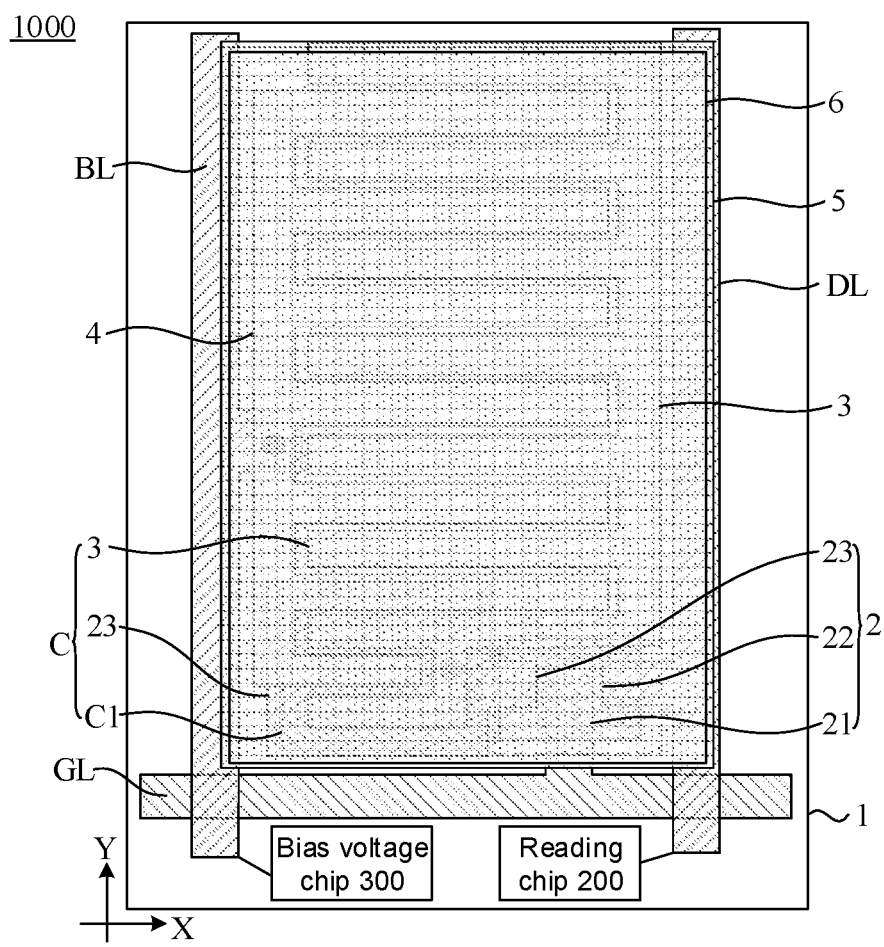
FIG. 12 is a structural diagram of a ray detector, in accordance with some embodiments of the present disclosure.

Some embodiments of the present disclosure provide a ray detector 1000. As shown in FIG. 12, the ray detector 1000 includes the ray detector substrate 100 provided in any of the embodiments described above, a reading chip 200 electrically connected to the ray detector substrate 100, and a bias voltage chip 300 electrically connected the ray detector substrate 100.

Figure 13:
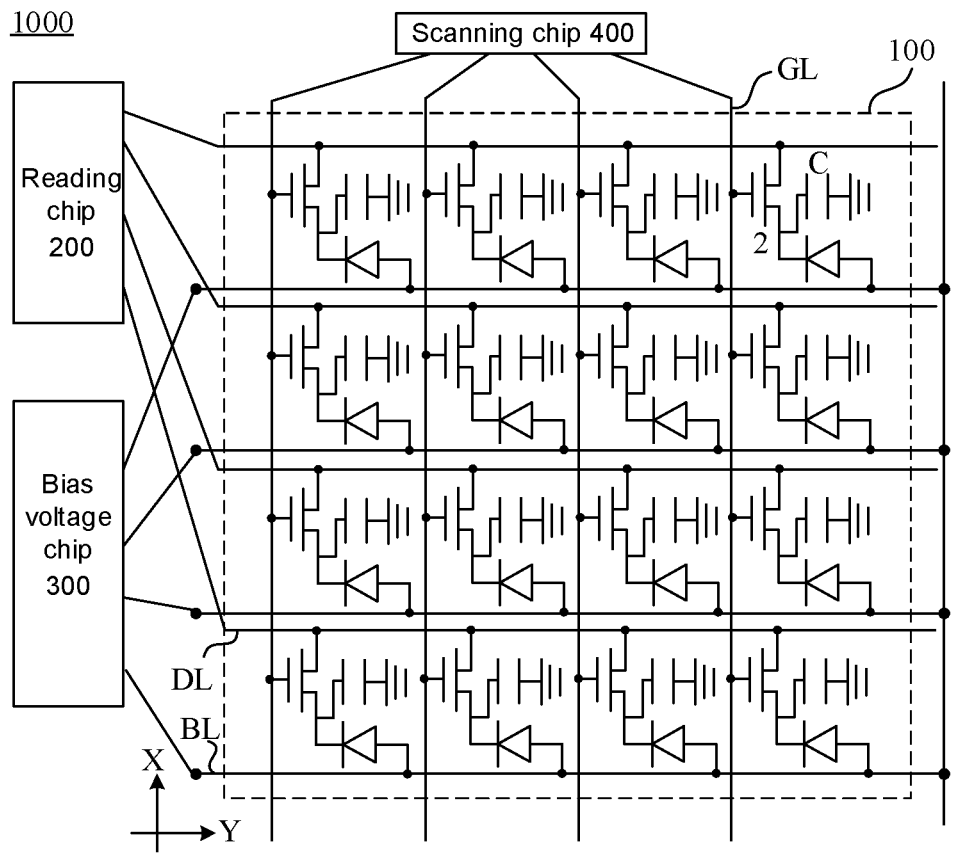
FIG. 13 is an equivalent circuit diagram of a ray detector, in accordance with some embodiments of the present disclosure.

In some examples, as shown in FIG. 13, the reading chip 200 may be electrically connected to the plurality of data lines DL in the ray detector substrate 100. The reading chip 200 is configured to provide operating voltages to first interdigital electrodes 3 in the ray detector substrate 100, and read an electrical signal (e.g., photocurrent) stored in the first interdigital electrodes 3.

In some examples, as shown in FIG. 13, the bias voltage chip 300 may be electrically connected to the plurality of bias voltage signal lines BL in the ray detector substrate 100. The bias voltage chip 300 is configured to provide bias voltages to second interdigital electrodes 4 in the ray detector substrate 100.

In some examples, as shown in FIG. 13, the ray detector 1000 further includes a scanning chip 400 electrically connected to the plurality of gate lines GL in the ray detector substrate 100. The scanning chip 400 is configured to provide scanning signals to the plurality of gate lines GL in the ray detector substrate 100, so as to control operation states of transistors 2 electrically connected to the plurality of gate lines GL.

In some examples, FIG. 13 is an equivalent circuit diagram of the ray detector 1000. An operation principle of the ray detector 1000 will be schematically described below by taking the equivalent circuit diagram shown in FIG. 13 as an example.

First, the scanning chip 400 transmits first scanning signal to the plurality of gate lines GL in the ray detector substrate 100 to control corresponding transistors 2 electrically connected to the plurality of gate lines GL to be turned on.

After the transistors 2 are turned on, the reading chip 200 provides the operating voltages to the plurality of data lines DL in the ray detector substrate 100, and the operating voltages are transmitted through corresponding transistors 2 electrically connected to the plurality of data lines DL to first interdigital electrodes 3 electrically connected to the corresponding transistors 2. The bias voltage chip 300 provides the bias voltages to the plurality of bias voltage signal lines BL in the ray detector substrate 100 and transmits the bias voltages to corresponding second interdigital electrodes 4 electrically connected to the plurality of bias voltage signal lines BL. There is a voltage difference between the operating voltage and the bias voltage, so that the electric field is developed between the first interdigital electrode 3 and the second interdigital electrode 4.

Next, the scanning chip 400 transmits second scanning signals to the plurality of gate lines GL to control the corresponding transistors 2 electrically connected to the plurality of gate lines GL to be turned off.

After the transistors 2 are turned off, X-rays are incident onto the second scintillator layer 6 in the ray detector substrate 100. In this case, due to the action of the electric field, the second scintillator layer 6 converts part of the X-rays into visible light, and transmits another part of the X-rays that is not converted, so that the another part of the X-rays is incident onto the first scintillator layer 5 in the ray detector substrate 100 through the second scintillator layer 6. The first scintillator layer 5 converts the visible light and the another part of the X-rays that is not converted by the second scintillator layer 6 into photocurrent due to the action of the electric field.

After the photocurrent is obtained, the photocurrent charges the storage capacitor C in the ray detector substrate 100, and the charges of the photocurrent are stored in the storage capacitor plate C1.

After the charging of the storage capacitors C is completed, the scanning chip 400 transmits the first scanning signals to the plurality of gate lines GL to control the corresponding transistors 2 to be turned on. In this case, a potential of the storage capacitor plate C1 is pulled down by the reading chip 200 to be the same as a reference potential of the reading chip 200. In this process, the charges stored in the storage capacitor C are discharged through a corresponding transistor 2 electrically connected to the storage capacitor C, the potential on the storage capacitor plate C1 is restored to an initial state, and the reading chip 200 reads the charges.

Through the above operating process, the ray detector 1000 realizes the detection of the X-rays.

Beneficial effects of the ray detector 1000 provided in the embodiments of the present disclosure are the same as beneficial effects of the ray detector substrate 100 provided in the embodiments, which will not be repeated here.

Figure 14:
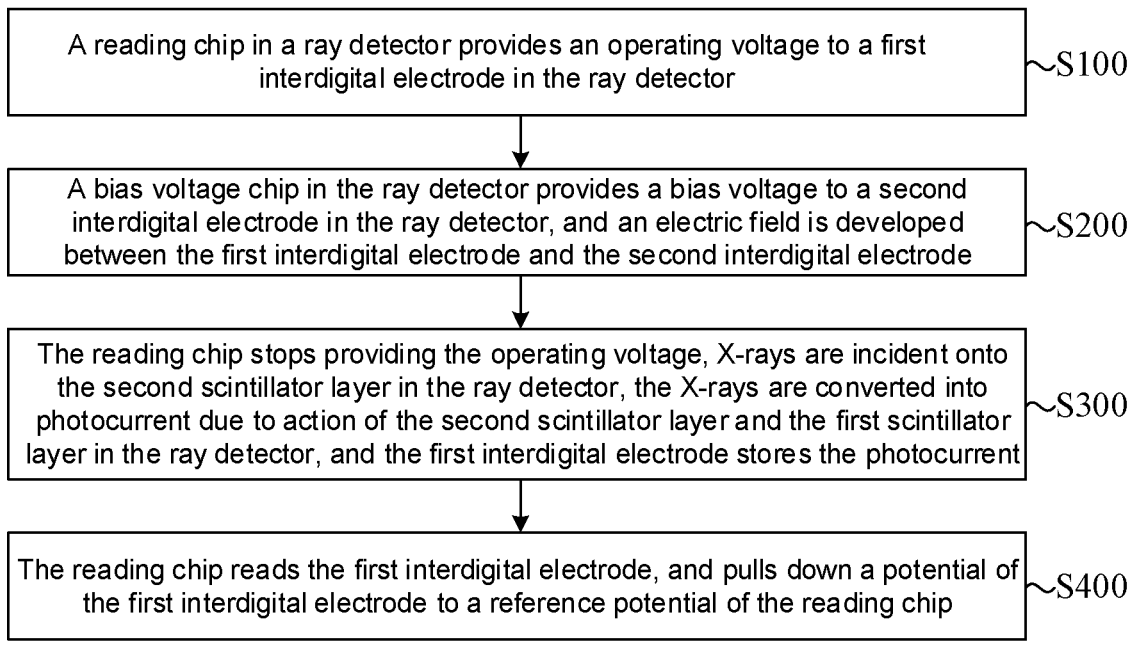
FIG. 14 is a flow diagram of a ray detection method, in accordance with some embodiments of the present disclosure.

Some embodiments of the present disclosure provide a ray detection method, and the detection method is applied to the ray detector 1000 provided in any of the embodiments described above. Considering a type of the ray as X-ray as an example, as shown in FIG. 14, the detection method includes steps 100 to 400 (S100 to S400).

In S100, the reading chip 200 in the ray detector 1000 provides the operating voltage to the first interdigital electrode 3 in the ray detector 1000.

In S200, the bias voltage chip 300 in the ray detector 1000 provides the bias voltage to the second interdigital electrode 4 in the ray detector 1000, and the electric field is developed between the first interdigital electrode 3 and the second interdigital electrode 4.

In S300, the reading chip 200 stops providing the operating voltage, and the X-rays are incident onto the second scintillator layer 6 in the ray detector 1000. The X-rays are converted into photocurrent due to action of the second scintillator layer 6 and the first scintillator layer 5 in the ray detector 1000, and the first interdigital electrode 3 stores the photocurrent.

In S400, the reading chip 200 reads the first interdigital electrode 3, and pulls down the potential of the first interdigital electrode 3 to the reference potential of the reading chip 200.

As for the specific process of the detection method, reference may be made to the operation principle of the ray detector 1000, which will not be repeated here.

Beneficial effects of the detection method for a ray provided in the embodiments of the present disclosure are the same as the beneficial effects of the ray detector 1000 provided in the embodiments, i.e., the same as the beneficial effects of the ray detector substrate 100 provided in the embodiments, which will not be repeated here.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A ray detector substrate, having a plurality of detection regions, the ray detector substrate comprising:
    a substrate;
    a first interdigital electrode and a second interdigital electrode disposed on a side of the substrate and located in each detection region;
    a first scintillator layer disposed on a side of the first interdigital electrode and the second interdigital electrode away from the substrate;
    a second scintillator layer disposed on a side of the first scintillator layer away from the substrate; and
    a mesoporous film disposed on a side of the first interdigital electrode and the second interdigital electrode proximate to the first scintillator layer; wherein
    the second scintillator layer is configured to convert part of rays incident onto the detection region into visible light, and transmit another part of the rays, so that the another part of the rays is incident onto the first scintillator layer through the second scintillator layer; and
    the first scintillator layer is configured to convert the visible light converted by the second scintillator layer and the another part of the rays through the second scintillator layer into photocurrent.

2. The ray detector substrate according to claim 1, wherein a material of the first scintillator layer includes a first perovskite material, and a material of the second scintillator layer includes a second perovskite material.

3. The ray detector substrate according to claim 2, wherein at least one halogen element of the first perovskite material and at least one halogen element of the second perovskite material are different.

4. The ray detector substrate according to claim 2, wherein the at least one halogen element of the first perovskite material include at least one of chlorine, bromine or iodine; and the at least one halogen element of the second perovskite material include at least one of chlorine, bromine or iodine.

5. The ray detector substrate according to claim 1, wherein a band gap of the first scintillator layer is less than or equal to a band gap of the second scintillator layer.

6. The ray detector substrate according to claim 1, wherein a thickness of the first scintillator layer is less than a thickness of the second scintillator layer.

7. The ray detector substrate according to claim 6, wherein the thickness of the first scintillator layer is in a range of 0.1 µm to 20 µm, inclusive; and the thickness of the second scintillator layer is in a range of 30 µm to 300 µm, inclusive.

8. The ray detector substrate according to claim 1, further comprising an insulating layer disposed on a side of the first interdigital electrode and the second interdigital electrode proximate to the first scintillator layer, wherein
a band gap of the insulating layer is in a range of 4 eV to 9 eV, inclusive.

9. The ray detector substrate according to claim 8, wherein a thickness of the insulating layer is in a range of 1 nm to 10 nm, inclusive.

10. The ray detector substrate according to claim 8, wherein a material of the insulating layer includes at least one of silicon nitride, an aluminum oxide, or a lead-containing compound.

11. The ray detector substrate according to claim 1, wherein a thickness of the mesoporous film is in a range of 0.1 µm to 100 µm, inclusive.

12. The ray detector substrate according to claim 1, wherein a material of the mesoporous film includes at least one of a titanium oxide, a molybdenum oxide, a cobalt oxide, a zinc oxide, a magnesium oxide, a tin oxide, a chromium oxide or a cerium oxide.

13. The ray detector substrate according to claim 1, further comprising a reflective layer disposed on a side of the second scintillator layer away from the substrate, wherein
the reflective layer is configured to transmit the rays to be incident onto the second scintillator layer through the reflective layer, and reflect the visible light that is converted by the second scintillator layer and incident onto the reflective layer.

14. The ray detector substrate according to claim 1, further comprising:
a plurality of gate lines disposed on a side of the substrate proximate to the first interdigital electrode and the second interdigital electrode and extending in a first direction;
a plurality of data lines disposed on the side of the substrate proximate to the first interdigital electrode and the second interdigital electrode and extending in a second direction, the plurality of gate lines and the plurality of data lines being insulated from each other, and the plurality of gate lines and the plurality of data lines intersecting to define the plurality of detection regions;
a plurality of bias voltage signal lines disposed in a same layer as the plurality of data lines and extending in the second direction; and
a transistor disposed on the side of the substrate proximate to the first interdigital electrode and the second interdigital electrode and located in the detection region, one of a source and a drain of the transistor being electrically connected to a data line; wherein
the first interdigital electrode is electrically connected to another of the source and the drain of the transistor, and the second interdigital electrode is electrically connected to a bias voltage signal line.

15. The ray detector substrate according to claim 14, further comprising a storage capacitor plate disposed in the detection region, wherein
the storage capacitor plate is arranged in a same layer as the plurality of gate lines; and
the storage capacitor plate, the first interdigital electrode, and the source or the drain of the transistor that is electrically connected to the first interdigital electrode constitute a storage capacitor.

16. A ray detector, comprising:
the ray detector substrate according to claim 1;
a reading chip electrically connected to the ray detector substrate, the reading chip being configured to provide an operating voltage to the first interdigital electrode in the ray detector substrate, and read an electrical signal stored in the first interdigital electrode; and
a bias voltage chip electrically connected to the ray detector substrate, the bias voltage chip being configured to provide a bias voltage to the second interdigital electrode in the ray detector substrate.

17. A ray detection method, applied to the ray detector according to claim 16, the method comprising:
providing, by the reading chip in the ray detector, the operating voltage to the first interdigital electrode in the ray detector;
providing, by the bias voltage chip in the ray detector, the bias voltage to the second interdigital electrode in the ray detector, an electric field being developed between the first interdigital electrode and the second interdigital electrode;
the reading chip stopping providing the operating voltage, the rays being incident onto the second scintillator layer in the ray detector, the rays being converted into photocurrent due to action of the second scintillator layer and the first scintillator layer in the ray detector, and the first interdigital electrode storing the photocurrent;
reading, by the reading chip, the photocurrent stored in the first interdigital electrode; and
pulling down, by the reading chip, a potential of the first interdigital electrode to a reference potential of the reading chip.

18. A ray detector substrate, having a plurality of detection regions, the ray detector substrate comprising:
a substrate;
a first interdigital electrode and a second interdigital electrode disposed on a side of the substrate and located in each detection region;
a first scintillator layer disposed on a side of the first interdigital electrode and the second interdigital electrode away from the substrate;
a second scintillator layer disposed on a side of the first scintillator layer away from the substrate; and
a reflective layer disposed on a side of the second scintillator layer away from the substrate, wherein
the second scintillator layer is configured to convert part of rays incident onto the detection region into visible light, and transmit another part of the rays, so that the another part of the rays is incident onto the first scintillator layer through the second scintillator layer;
the first scintillator layer is configured to convert the visible light converted by the second scintillator layer and the another part of the rays through the second scintillator layer into photocurrent; and the reflective layer is configured to transmit the rays to be incident onto the second scintillator layer through the reflective layer, and reflect the visible light that is converted by the second scintillator layer and incident onto the reflective layer.

19. A ray detector substrate, having a plurality of detection regions, the ray detector substrate comprising:
- a substrate;
- a first interdigital electrode and a second interdigital electrode disposed on a side of the substrate and located in each detection region;
- a first scintillator layer disposed on a side of the first interdigital electrode and the second interdigital electrode away from the substrate;
- a second scintillator layer disposed on a side of the first scintillator layer away from the substrate;
- a plurality of gate lines disposed on a side of the substrate proximate to the first interdigital electrode and the second interdigital electrode and extending in a first direction;
- a plurality of data lines disposed on the side of the substrate proximate to the first interdigital electrode and the second interdigital electrode and extending in a second direction, the plurality of gate lines and the plurality of data lines being insulated from each other, and the plurality of gate lines and the plurality of data lines intersecting to define the plurality of detection regions;
- a plurality of bias voltage signal lines disposed in a same layer as the plurality of data lines and extending in the second direction; and
- a transistor disposed on the side of the substrate proximate to the first interdigital electrode and the second interdigital electrode and located in the detection region, one of a source and a drain of the transistor being electrically connected to a data line; wherein the second scintillator layer is configured to convert part of rays incident onto the detection region into visible light, and transmit another part of the rays, so that the another part of the rays is incident onto the first scintillator layer through the second scintillator layer;

the first scintillator layer is configured to convert the visible light converted by the second scintillator layer and the another part of the rays through the second scintillator layer into photocurrent; and the first interdigital electrode is electrically connected to another of the source and the drain of the transistor, and the second interdigital electrode is electrically connected to a bias voltage signal line.

\* \* \* \* \*